(12) United States Patent
Agarwal et al.

(10) Patent No.: US 10,875,989 B2
(45) Date of Patent: *Dec. 29, 2020

(54) CURED GUAYULE RUBBER CONTAINING COMPOSITIONS AND METHOD FOR PREPARING SAME

(71) Applicant: Bridgestone Corporation, Chuo-ku (JP)

(72) Inventors: Sheel P. Agarwal, Solon, OH (US); Yingyi Huang, Hudson, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,058

(22) Filed: Sep. 9, 2019

(65) Prior Publication Data

US 2020/0002513 A1 Jan. 2, 2020

Related U.S. Application Data

(63) Continuation of application No. 15/894,278, filed on Feb. 12, 2018, now Pat. No. 10,407,564, which is a continuation of application No. 13/787,644, filed on Mar. 6, 2013, now Pat. No. 9,890,268.

(60) Provisional application No. 61/607,494, filed on Mar. 6, 2012.

(51) Int. Cl.
| | | |
|---|---|---|
| *C08L 7/00* | (2006.01) | |
| *C08L 21/00* | (2006.01) | |
| *C08K 3/013* | (2018.01) | |

(52) U.S. Cl.
CPC ............... *C08L 7/00* (2013.01); *C08K 3/013* (2018.01); *C08L 21/00* (2013.01)

(58) Field of Classification Search
CPC ............ C08L 7/00; C08L 21/00; C08K 3/013
USPC ...................................................... 523/156
See application file for complete search history.

(56) References Cited

U.S. PATENT DOCUMENTS

| | | | |
|---|---|---|---|
| 957,495 A | 5/1910 | Chute et al. | |
| 4,542,191 A | 9/1985 | Kay et al. | |
| 4,621,118 A | 11/1986 | Schloman, Jr. et al. | |
| 4,647,607 A | 3/1987 | Kay et al. | |
| 4,678,860 A | 7/1987 | Kuester | |
| 4,786,683 A | 11/1988 | Schloman, Jr. et al. | |
| 4,804,741 A | 2/1989 | Verbiscar et al. | |
| 6,054,525 A | 4/2000 | Schloman, Jr. et al. | |
| 2010/0163150 A1* | 7/2010 | Hirayama et al. | B60C 11/01 152/532 |

FOREIGN PATENT DOCUMENTS

| | | |
|---|---|---|
| EP | 0853010 A1 | 7/1998 |
| GB | 2164341 A | 3/1986 |
| GB | 2174403 A | 11/1986 |
| JP | 11-012306 A | 1/1999 |
| JP | 2003-040902 A | 2/2003 |
| WO | 2009-025675 A1 | 2/2009 |
| WO | 2009-129249 A2 | 10/2009 |

OTHER PUBLICATIONS

McIntyre et al., Guayule Rubber, Handbook of Elastomers, pp. 1-27 (Year: 2001).*
Rule 132 Affidavit from U.S. Appl. No. 13/787,644 dated Jul. 2015.
Belmares, H. et al. New Rubber Peptizers and Coatings Derived from Guayule Resin, Industrial and Engineering Chemistry: Product Research and Development, vol. 19, pp. 107-111 (1980).
Curtis, O.F. Jr., Plant Physiology, Distribution of Rubber and Resins in Guayule. vol. 22, No. 4, pp. 333-359 (Oct. 1947).
Doering, Guayule Rubber in Tires and Tubes, Service Tests in Which the Rubber was Exclusively Guayule. Industrial and Engineering Chemistry, vol. 26. No. 5, pp. 541-543, (May 1934).
Keller, R.W., D.S. Winkler, and H.L. Stephens. Degradative Effects of Guayule Resin on Natural Rubber. Rubber Chemistry and Technology. vol. 54, pp. 115-123, (1981).
McIntyre, et al., Guayule Rubber. Handbook of Elastomers, pp. 1-27, (2001).
Schloman, W. W. Jr. et al., Rubber Additives Derived from Guayule Resin. Industrial and Eng'r Chem. Research, vol. 27, pp. 712-716 (1988).
Schloman, W. W. Jr., et al., Guayule Byproduct Evaluation: Extract Characterization, J. Agricultural and Food Chemistry, vol. 31, pp. 873-876 (1983).
Schloman, W. W. Jr., et al., Water Stress and Seasonal Effects on Rubber Quality in Irrigated Guayule. J. Agricultural and Food Chemistry v. 34, pp. 683-685 (1986).
Schloman, W. W. Jr., et al., Water Stress and Seasonal Effects on Guayule Resin Composition. J. Agricultural and Food Chemistry, v. 34, pp. 177-179 (1986).
Chang, M., et al., Hydrolysis of Guayule Cellulose for Alcohol Production (1983), in Proceedings of the Third International Guayule Conference, E.C. Gregg, J.L. Tipton and H.Th Huang, eds., Pasadena, Calif., 1980, Guayule Rubber Soc.: Riverside, Calif., 211-224.
First Office Action in Chinese Application No. 2009801224454 dated (Mar. 27, 2012).
Second Office Action in Chinese Application No. 2009801224454 dated (Jun. 27, 2012).
Gelling, I.R. Modification of Nautral Rubber Latex With Peracetic Acid. Rubber Chemistry and Technology. vol. 58, pp. 86-96. (1985).
King, R.J., and D. M. Mondimore. HPLC Procedure for the determination of Free Sulfur in Natural Rubber Formulations. Rubber Chemistry and Technology. vol. 60, pp. 716-720 (1987).

(Continued)

*Primary Examiner* — Angela C Scott
(74) *Attorney, Agent, or Firm* — Meredith E. Hooker; Jenny L. Sheaffer

(57) ABSTRACT

Provided herein are cured rubber compositions containing guayule natural rubber with 2.5-4 weight % resin and fillers. By the use of a specified cure package that contains increased amounts of sulfur and accelerator, the cured rubber compositions are found to exhibit strain induced crystallization (as can be observed by X-ray diffraction). Also provided are related methods for preparing the rubber compositions.

20 Claims, 5 Drawing Sheets

(56) References Cited

OTHER PUBLICATIONS

J. Brad Murphy and C.A. Stutte; Analytical Biochemistry 86, 220-228; Analysis for Substituted Benzoic and Cinnamic Acids Using High-Pressure Liquid Chromatography (1978).
Subramaniam, A., J. Rubb. Res. Inst. Malaysia 25(2), 61-68; Estimation of Aldehyde Groups in Natural Rubber with 2,4-dinitrophenylhydrazine (1977).
Abstract—Week 200365 Thomson Scientific London, GB, AN 2003-682828, XP000002567182, JP2003040902A (Nitto Denko Corp) (Feb. 13, 2003).
Cataldo, Guayule Rubber: A New Possible World Scenario for the Production of Natural Rubber? Progress in Rubber and Plastics technology, vol. 16, No. 1, 2000. pp. 31-50.
Non-final rejection from U.S. Appl. No. 13/787,644 dated Jan. 2015.
Response from U.S. Appl. No. 13/787,644 dated Jul. 2015.
Final rejection from U.S. Appl. No. 13/787,644 dated Sep. 2015.
Response from U.S. Appl. No. 13/787,644 dated Nov. 2015.
Non-final rejection from U.S. Appl. No. 13/787,644 dated Jun. 2016.
Response from U.S. Appl. No. 13/787,644 dated Dec. 2016.
Final rejection from U.S. Appl. No. 13/787,644 dated Jul. 2017.
Response from U.S. Appl. No. 13/787,644 dated Aug. 2017.
Rule 132 Affidavit from U.S. Appl. No. 13/787,644 dated Dec. 2016.
Notice of allowance from U.S. Appl. No. 13/787,644 dated Oct. 2017.
Non-final rejection from U.S. Appl. No. 13/787,644 dated Jul. 2014.
Response from U.S. Appl. No. 13/787,644 dated Nov. 2014.
Response from U.S. Appl. No. 15/894,278 dated Jan. 2019.
Non-final rejection from U.S. Appl. No. 15/894,278 dated Nov. 2018.
Notice of allowance from U.S. Appl. No. 15/894,278 dated May 2019.

\* cited by examiner

CURED GUAYULE RUBBER CONTAINING COMPOSITIONS AND METHOD FOR PREPARING SAME

CROSS-REFERENCE TO RELATED APPLICATION

This application is a continuation of U.S. patent application Ser. No. 15/894,278, filed Feb. 12, 2018, which is a continuation of U.S. patent application Ser. No. 13/787,644, filed Mar. 6, 2013, which issued on Feb. 13, 2018 under U.S. Pat. No. 9,890,268, which claims priority to and any other benefit of U.S. Provisional Patent Application Ser. No. 61/607,494, filed Mar. 6, 2012, and entitled "CURED GUAYULE RUBBER CONTAINING COMPOSITIONS AND METHODS FOR PREPARING SAME," the entire disclosures of which are incorporated by reference herein.

BACKGROUND

Natural rubber sourced from the guayule shrub is well-known to contain a significant amount of resin. The common understanding among those skilled in the art has been that the resin has detrimental effects on rubber compositions for use in tire-related components and to attempt to remove as much of the resin as possible.

SUMMARY

Provided herein are cured guayule-rubber containing compositions which exhibit strain induced crystallization and methods for preparing those compositions. It was surprisingly found that cured rubber compositions containing guayule natural rubber with 2.5-4 weight % resin exhibited strain induced crystallization when the cure package was adjusted to increase the amount of sulfur and accelerator but without any need to increase the amount of stearic acid. This discovery was contrary to previous teachings which were directed at removing as much resin as possible from the guayule natural rubber (thereby increasing processing time and cost in the guayule natural rubber production process) in an attempt to limit crack growth propagation in rubber compositions containing the guayule natural rubber. Because the raw plant matter from the guayule shrub can contain a considerable amount of resin that is difficult to separate from the natural rubber also contained therein, the ability to use guayule natural rubber containing as much as 4 weight % resin has the potential to decrease processing complexity and costs associated with isolation of natural rubber from the guayule shrub.

In a first embodiment is provided a cured rubber composition comprising: (a) 100 phr of guayule natural rubber, where the guayule natural rubber contains 2.5-4 weight % resin and (b) 5-100 phr of at least one filler selected from the group consisting of carbon black and silica. The cure package used to prepare the cured rubber composition comprises: (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator and the cured rubber composition exhibits strain induced crystallization (as can be observed by X-ray diffraction).

In a second embodiment is provided a cured rubber composition comprising: (a) 10-90 phr of guayule natural rubber, where the guayule natural rubber contains 2.5-4 weight % resin, (b) 90-10 phr of at least one conjugated diene monomer containing polymer or copolymer, and (c) 5-100 phr of at least one filler selected from the group consisting of carbon black and silica. The cure package used to prepared the cured rubber composition comprises: (i) 1.2 to 4 phr sulfur, (ii) 0.5 to 5 phr of at least one antioxidant (standard), (iii) 0.5 to 5 phr zinc oxide, (iv) 0.5 to 4 phr stearic acid, (iv) 1.05 to 3 phr of at least one accelerator and the cured rubber composition exhibits strain induced crystallization as can be observed by X-ray diffraction.

In a third embodiment is provided a method of providing a cured guayule natural rubber containing composition with strain induced crystallization. In the method, a rubber composition is utilized that contains (i) 100 phr of guayule natural rubber that contains 2.5-4 weight % resin and (ii) 5-100 phr of at least one filler selected from the group consisting of carbon black and silica and a cure package is utilized that contains (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator to produce a cured guayule natural rubber containing composition. The cured guayule natural rubber containing composition exhibits strain induced crystallization (as evidenced by X-ray diffraction).

In a fourth embodiment is provided a method of providing a cured guayule natural rubber containing composition with strain induced crystallization. In the method, a rubber composition is utilized that contains (i) 1-90 phr of guayule natural rubber that contains 2.5-4 weight % resin, (ii) 90-10 phr of at least one conjugated diene monomer containing polymer or copolymer, and (iii) 5-100 phr of at least one filler selected from the group consisting of carbon black and silica and a cure package is utilized that contains (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator to produce a cured guayule natural rubber containing composition. The cured guayule natural rubber containing composition exhibits strain induced crystallization (as evidenced by X-ray diffraction).

In a fifth embodiment is provided a method of providing a cured guayule natural rubber containing composition with strain induced crystallization comprising: utilizing a rubber mixture comprising (i) 100 phr of guayule natural rubber that contains 2.5-4 weight % resin and (ii) 5-100 phr of at least one filler selected from the group consisting of carbon black and silica, and curing the rubber mixture by increasing the amount of sulfur in the cure package by 30-300% and increasing the amount of accelerator by 30-200% each as compared to a comparative rubber composition that contains Hevea natural rubber instead of guayule natural rubber. The cured guayule natural rubber containing composition and the comparative rubber composition both exhibit strain induced crystallization (as can be observed by X-ray diffraction) and have a max stress at break, a 300% MPa and an elongation at break that are no more than +/−15% different. The tan delta at 0° C. and 50° C. (obtained from temperature sweep experiments conducted with a frequency of 31.4 rad/sec using 0.5% strain for temperatures ranging from −100° C. to −10° C., and with 2% strain for temperatures ranging from −10° C. to 100° C.) of the cured guayule natural rubber containing composition is no more than 5% different that the tan delta at 0° C. and 50° C. of the comparative rubber composition.

In a sixth embodiment is provided a method of providing a cured guayule natural rubber containing composition with strain induced crystallization comprising: utilizing a rubber mixture comprising (i) 1-90 phr of guayule natural rubber that contains 2.5-4 weight % resin, (ii) 90-10 phr of at least one conjugated diene monomer containing polymer or copolymer, and (iii) 5-100 phr of at least one filler selected from the group consisting of carbon black and silica, and curing the rubber mixture by increasing the amount of sulfur in the cure package by 30-300% and increasing the amount of accelerator by 30-200% each as compared to a comparative rubber composition that contains Hevea natural rubber instead of guayule natural rubber. The cured guayule natural rubber containing composition and the comparative rubber composition both exhibit strain induced crystallization (as can be observed by X-ray diffraction) and have a max stress at break, a 300% MPa and an elongation at break that are no more than +/−15% different. The tan delta at 0° C. and 50° C. (obtained from temperature sweep experiments conducted with a frequency of 31.4 rad/sec using 0.5% strain for temperatures ranging from −100° C. to −10° C., and with 2% strain for temperatures ranging from −10° C. to 100° C.) of the cured guayule natural rubber containing composition is no more than 5% different that the tan delta at 0° C. and 50° C. of the comparative rubber composition.

DETAILED DESCRIPTION

Figure 1:
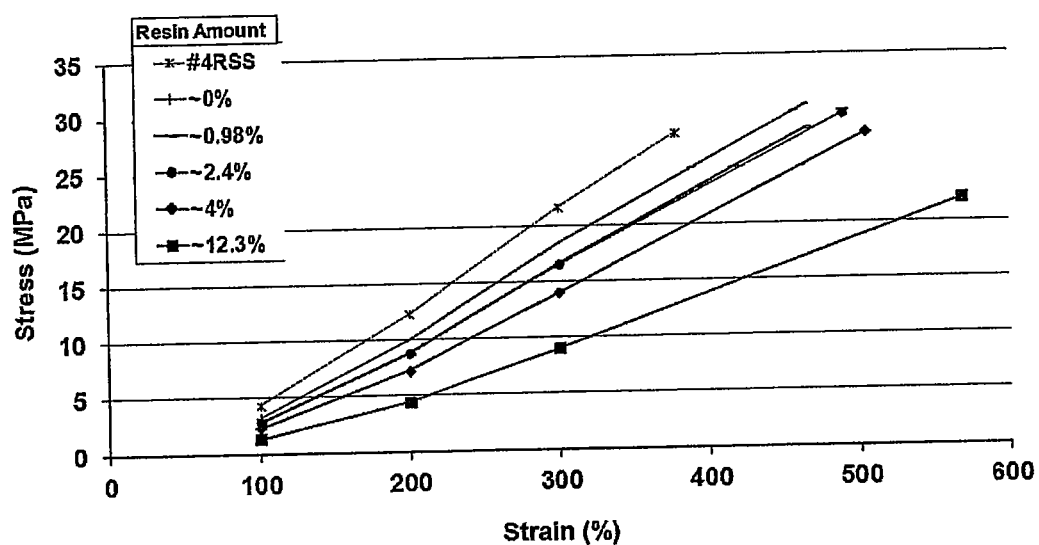
FIG. 1 is a graph showing tensile properties of rubber compositions containing Hevea natural rubber and varying amounts of guayule-sourced resin at various elongations and at break.

Provided herein are cured guayule-rubber containing compositions which exhibit strain induced crystallization and methods for preparing those compositions.

Definitions

The terminology as set forth herein is for description of the embodiments only and should not be construed as limiting the invention as a whole.

As used herein the term "resin" means the naturally occurring non-rubber chemical entities present in non-Hevea plants such as guayule shrubs matter. These chemical entities include, but are not limited to, resins (such as terpenes), fatty acids, proteins, and inorganic materials, and include both polar and non-polar moieties.

Rubber Compositions and Methods

In a first embodiment is provided a cured rubber composition comprising: (a) 100 phr of guayule natural rubber, where the guayule natural rubber contains 2.5-4 weight % resin and (b) 5-100 phr of at least one filler selected from the group consisting of carbon black and silica. The cure package used to prepare the cured rubber composition comprises: (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator and the cured rubber composition exhibits strain induced crystallization (as can be observed by X-ray diffraction).

In a second embodiment is provided a cured rubber composition comprising: (a) 10-90 phr of guayule natural rubber, where the guayule natural rubber contains 2.5-4 weight % resin, (b) 90-10 phr of at least one conjugated diene monomer containing polymer or copolymer, and (c) 5-100 phr of at least one filler selected from the group consisting of carbon black and silica. The cure package used to prepared the cured rubber composition comprises: (i) 1.2 to 4 phr sulfur, (ii) 0.5 to 5 phr of at least one antioxidant (standard), (iii) 0.5 to 5 phr zinc oxide, (iv) 0.5 to 4 phr stearic acid, (iv) 1.05 to 3 phr of at least one accelerator and the cured rubber composition exhibits strain induced crystallization as can be observed by X-ray diffraction.

In a third embodiment is provided a method of providing a cured guayule natural rubber containing composition with strain induced crystallization. In the method, a rubber composition is utilized that contains (i) 100 phr of guayule natural rubber that contains 2.5-4 weight % resin and (ii) 5-100 phr of at least one filler selected from the group consisting of carbon black and silica and a cure package is utilized that contains (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator to produce a cured guayule natural rubber containing composition. The cured guayule natural rubber containing composition exhibits strain induced crystallization (as evidenced by X-ray diffraction).

In a fourth embodiment is provided a method of providing a cured guayule natural rubber containing composition with strain induced crystallization. In the method, a rubber composition is utilized that contains (i) 1-90 phr of guayule natural rubber that contains 2.5-4 weight % resin, (ii) 90-10 phr of at least one conjugated diene monomer containing polymer or copolymer, and (iii) 5-100 phr of at least one filler selected from the group consisting of carbon black and silica and a cure package is utilized that contains (i) 1.2 to 4 phr sulfur, (ii) 0.5 to 5 phr of at least one antioxidant, (iii) 0.5 to 5 phr zinc oxide, (iv) 0.5 to 4 phr stearic acid, (iv) 1.05 to 3 phr of at least one accelerator to produce a cured guayule natural rubber containing composition. The cured guayule natural rubber containing composition exhibits strain induced crystallization (as evidenced by X-ray diffraction).

In a fifth embodiment is provided a method of providing a cured guayule natural rubber containing composition with strain induced crystallization comprising: utilizing a rubber mixture comprising (i) 100 phr of guayule natural rubber that contains 2.5-4 weight % resin and (ii) 5-100 phr of at least one filler selected from the group consisting of carbon black and silica, and curing the rubber mixture by increasing the amount of sulfur in the cure package by 30-300% and increasing the amount of accelerator by 30-200% each as compared to a comparative rubber composition that contains Hevea natural rubber instead of guayule natural rubber. The cured guayule natural rubber containing composition and the comparative rubber composition both exhibit strain induced crystallization (as can be observed by X-ray diffraction) and have a max stress at break, a 300% MPa and an elongation at break that are no more than +/−15% different. The tan delta at 0° C. and 50° C. (obtained from temperature sweep experiments conducted with a frequency of 31.4 rad/sec using 0.5% strain for temperatures ranging from −100° C. to −10° C., and with 2% strain for temperatures ranging from −10° C. to 100° C.) of the cured guayule natural rubber containing composition is no more than 5% different that the tan delta at 0° C. and 50° C. of the comparative rubber composition.

In a sixth embodiment is provided a method of providing a cured guayule natural rubber containing composition with strain induced crystallization comprising: utilizing a rubber mixture comprising (i) 1-90 phr of guayule natural rubber that contains 2.5-4 weight % resin, (ii) 90-10 phr of at least one conjugated diene monomer containing polymer or copolymer, and (iii) 5-100 phr of at least one filler selected from the group consisting of carbon black and silica, and curing the rubber mixture by increasing the amount of sulfur in the cure package by 30-300% and increasing the amount of accelerator by 30-200% each as compared to a comparative rubber composition that contains Hevea natural rubber instead of guayule natural rubber. The cured guayule natural rubber containing composition and the comparative rubber composition both exhibit strain induced crystallization (as can be observed by X-ray diffraction) and have a max stress at break, a 300% MPa and an elongation at break that are no more than +/−15% different. The tan delta at 0° C. and 50° C. (obtained from temperature sweep experiments conducted with a frequency of 31.4 rad/sec using 0.5% strain for temperatures ranging from −100° C. to −10° C., and with 2% strain for temperatures ranging from −10° C. to 100° C.) of the cured guayule natural rubber containing composition is no more than 5% different that the tan delta at 0° C. and 50° C. of the comparative rubber composition.

In certain embodiments according to the first and fourth embodiments described herein, the cured rubber composition has a max stress at break, a 300% MPa and an elongation at break that is no more than +/−15% as compared to a comparative rubber composition that contains Hevea natural rubber instead of guayule natural rubber. (The comparative rubber composition containing Hevea rubber has all other ingredients the same as the composition containing guayule natural rubber but simply replaces the guayule natural rubber with the same amount of Hevea natural rubber. In addition, the methods used to mix the ingredients of the Hevea rubber composition and the guayule natural rubber composition are the same.) In other embodiments according to the first and fourth embodiments described herein, the cured rubber composition has a max stress at break, a 300% MPa and an elongation at break that is no more than +/−10% as compared to a comparative rubber composition that contains Hevea natural rubber instead of guayule natural rubber. In yet other embodiments according to the first and fourth embodiments described herein, the cured rubber composition has a max stress at break, a 300% MPa and an elongation at break that is no more than +/−5% as compared to a comparative rubber composition that contains Hevea natural rubber instead of guayule natural rubber.

It is specifically contemplated that a tire component may be made from any of the rubber formulations according to the first and fourth embodiments disclosed herein. Non-limiting examples of tire components that may be made from the rubber formulations according to the first and fourth embodiments disclosed herein include treads, sidewalls and body skim plies.

In certain embodiments according to the second and fifth embodiments disclosed herein, the cured rubber composition has a max stress at break, a 300% MPa and an elongation at break that is no more than +/−15% as compared to a comparative rubber composition that contains Hevea natural rubber instead of guayule natural rubber. (The comparative rubber composition containing Hevea rubber has all other ingredients the same as the composition containing guayule natural rubber but simply replaces the guayule natural rubber with the same amount of Hevea natural rubber. In addition, the methods used to mix the ingredients of the Hevea rubber composition and the guayule natural rubber composition are the same.) In other embodiments according to the second and fifth embodiments described herein, the cured rubber composition has a max stress at break, a 300% MPa and an elongation at break that is no more than +/−10% as compared to a comparative rubber composition that contains Hevea natural rubber instead of guayule natural rubber. In yet other embodiments according to the second and fifth embodiments described herein, the cured rubber composition has a max stress at break, a 300% MPa and an elongation at break that is no more than +/−5% as compared to a comparative rubber composition that contains Hevea natural rubber instead of guayule natural rubber.

In certain embodiments according to the third and sixth embodiments disclosed herein, the cured rubber composition has a max stress at break, a 300% MPa and an elongation at break that is no more than +/−10% as compared to a comparative rubber composition that contains Hevea natural rubber instead of guayule natural rubber. In yet other embodiments according to the third and sixth embodiments described herein, the cured rubber composition has a max stress at break, a 300% MPa and an elongation at break that is no more than +/−5% as compared to a comparative rubber composition that contains Hevea natural rubber instead of guayule natural rubber.

In certain embodiments according to the fourth, fifth and sixth embodiments disclosed herein, the at least one conjugated diene monomer containing polymer or copolymer is selected from the group consisting of 1,3-butadiene, styrene-butadiene copolymer and polyisoprene. In other embodiments according to the third and sixth embodiments disclosed herein, the at least one conjugated diene monomer containing polymer or copolymer contains at least one monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene; and optionally at least one monomer selected from the group consisting of styrene, α-methyl styrene, p-methylstyrene, o-methylstyrene, p-butylstyrene and vinylnaphthalene.

In certain embodiments according to the first-sixth embodiments disclosed herein, the silica utilized (silicon dioxide) includes wet-process, hydrated silica produced by a chemical reaction in water, and precipitated as ultra-fine spherical particles. In certain of the foregoing embodiments, the silica has a surface area of about 32 to about 400 $m^2/g$, in another embodiment about 100 to about 250 m2/g, and in yet another embodiment, about 150 to about 220 $m^2/g$. The pH of the silica filler in certain of the foregoing embodiments is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

In certain embodiments according to the first-sixth embodiments disclosed herein, the carbon black(s) utilized may include any of the commonly available, commercially-produced carbon blacks. These include those having a surface area (EMSA) of at least 20 m²/gram and in other embodiments at least 35 m²/gram up to 200 m²/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black.

In certain embodiments according to the first-sixth embodiments disclosed herein, other conventional rubber additives may also be added to the rubber compositions. These include, for example, process oils, plasticizers, anti-degradants such as antioxidants and anti-ozonants, curing agents and the like.

Typically, process oils are added to tread rubber compositions as a softener. Non-limiting examples of process oils used in the tread rubber compositions disclosed herein include paraffinic, naphthenic, and aromatic process oils, and the like. In one or more embodiments according to the first-sixth embodiments disclosed herein, the process oil is an aromatic process oil. In other embodiments, the process oil is a low polycyclic aromatic content ("low PCA") oil containing less than 2%. Other useful oils include those containing less than 3 wt %, less than 2 wt % or less than 1 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE).

In certain embodiments according to the first-sixth embodiments disclosed herein, where the rubber compositions are used for treads, the rubber compositions preferably contain between 1 and 100 phr process oil. In one or more embodiments, the amount of process oil is between 2 and 100 phr; in other embodiments, between 1 and 50 phr; in others, between 2 and 50 phr. In still other embodiments, the amount of process oil is between 1 and 20 phr; in others, between 2 and 20 phr; in others, between 1 and 10 phr; in still others, between 2 and 10 phr.

When forming a tread rubber composition, generally all ingredients may be mixed with standard equipment such as, e.g., Banbury or Brabender mixers. Typically, mixing occurs in two or more stages. During the first stage (also known as the masterbatch stage), mixing typically is begun at temperatures of about 100° to about 130° C. and increases until a so-called drop temperature, typically about 165° C., is reached.

Where a rubber composition includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Curatives, accelerators, etc., are generally added at a final mixing stage. To avoid undesirable scorching and/or premature onset of vulcanization, this mixing step often is done at lower temperatures, e.g., starting at about 60° to about 65° C. and not going higher than about 105° to about 110° C. For purposes of this application, the term "final batch" means the composition that is present during the final mixing stage.

As previously discussed above, with respect to the first, second, fourth and fifth embodiments, the cured rubber composition or rubber mixture utilizes a cure package comprising 1.2-4 phr sulfur, 0.5 to 5 phr of at least one antioxidant, 0.5 to 5 phr of zinc oxide, 0.5-4 phr of stearic acid, and 1.05 to 3 phr of at least one accelerator. As also discussed above, with respect to the third and sixth embodiments, the amount of sulfur and accelerator in the cured guayule rubber containing composition is increased by 30-300% and 30-200% as compared to a comparative rubber composition that contains Hevea natural rubber instead of guayule natural rubber, respectively, in order to compensate for the resin content of the guayule natural rubber. As used herein, a 100% increase should be understood to be a doubling in amount. In certain embodiments of the third and sixth embodiments disclosed herein, the amount of sulfur in the cured guayule rubber composition is increased by 30-200%. As a non-limiting example of the increased amount of sulfur and accelerator, if the amount of sulfur and accelerator in the comparative rubber composition was 1.3 and 0.8, respectively, the amount of sulfur and accelerator in the guayule rubber containing composition could be 1.7-2.6 and 1.0-1.6, respectively.

Subsequently, the compounded mixture is processed (e.g., milled) into sheets prior to being formed into any of a variety of components and then vulcanized, which typically occurs at about 5° to about 15° C. higher than the highest temperatures employed during the mixing stages, most commonly about 170° C.

EXAMPLES

The following examples are for purposes of illustration only and are not intended to limit the scope of the claims which are appended hereto.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

In order to investigate the effect of various resin levels on the physical properties of cured guayule natural rubber containing rubber compositions, rubber formulations containing 100 phr of guayule natural rubber along with varying amounts of resin were prepared according to the formulas provided below in Table 1. The resins that were added were obtained from material that resulted from other work done on isolating natural rubber from guayule shrub using organic solvent based processes. This material represented the dried fraction (i.e., solvent removed) of material isolated in the polar organic solvent phase from the process. The amounts of resin added are weight % based upon the total weight of the natural rubber ((in other words, the stock indicated as containing 1% resin utilized natural rubber that contained 1 weight % rubber so that the rubber was 99 parts rubber and 1 part resin). The same convention is used in Table 2 below for the Yulex 1% and 2.5% rubbers.

TABLE 1

| Ingredient/Amount (in phr) | Stock A | Stock B | Stock C | Stock D | Stock E | Stock F |
|---|---|---|---|---|---|---|
| Rubber | 100 (#4RSS)[1] | 100 (Yulex)[2] | 100 (Yulex) | 100 (Yulex) | 100 (Yulex) | 100 (Yulex) |
| Amount of resin (weight %) | | 0 | 1.0 | 2.0 | 4.0 | 12.0 |
| Carbon black | 50 | 50 | 50 | 50 | 50 | 50 |
| Stearic acid | 2 | 2 | 2 | 2 | 2 | 2 |
| Antioxidant (6PPD) | 1 | 1 | 1 | 1 | 1 | 1 |
| Zinc oxide | 3 | 3 | 3 | 3 | 3 | 3 |
| Accelerator (TBBS)[3] | 0.8 | 0.8 | 0.8 | 0.72 | 0.64 | 0.56 |
| Sulfur | 1.3 | 1.3 | 1.3 | 1.17 | 1.04 | 0.91 |

Figure 2:
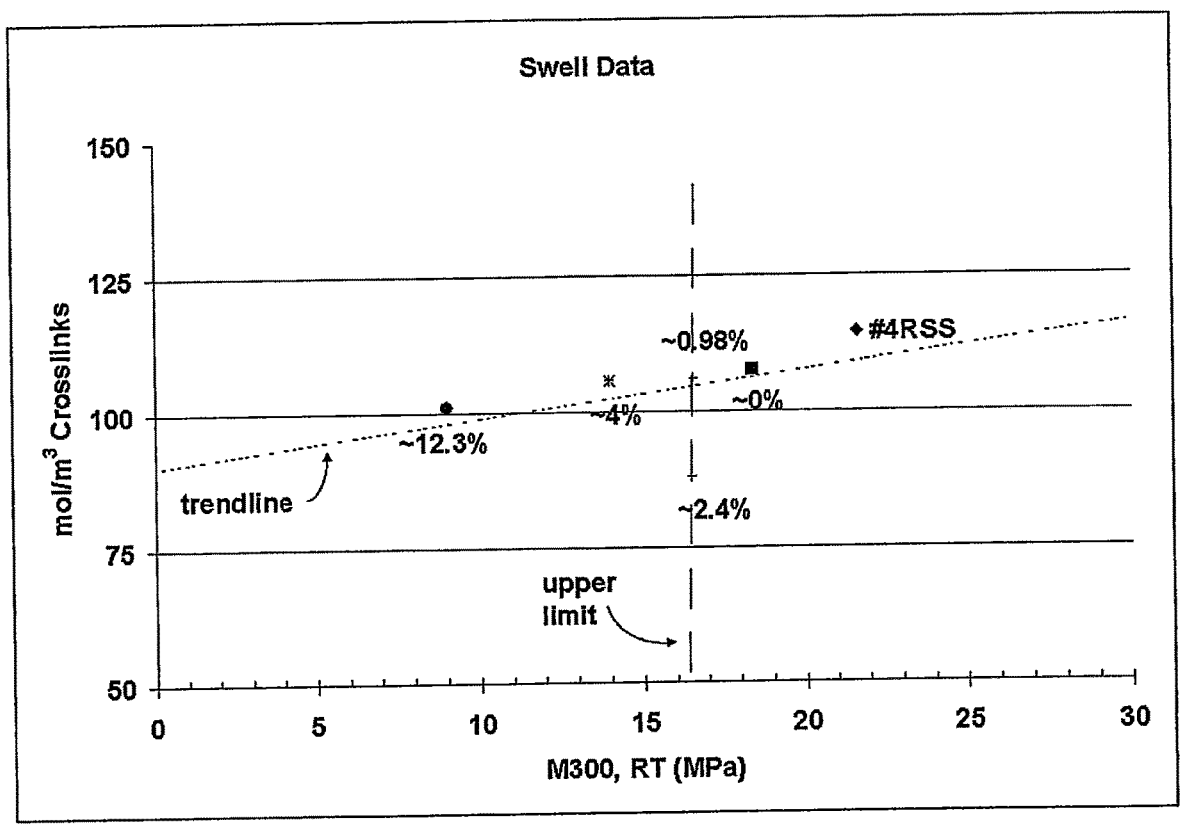
FIG. 2 is a graph showing crosslink density of rubber compositions.

[1]Hevea rubber in the form of #4 rubber smoked sheet (RSS)
[2]Yulex guayule rubber containing approximately 1 weight % resin
[3]2-(tert-butylaminothio)benzothiazole After formulating, samples of each stock were subjected to testing to determine the physical properties of the resulting stocks. Data obtained is illustrated in FIGS. 1 and 2. As can be seen from FIGS. 1 and 2, the physical properties of the rubber compositions generally decrease with an increasing amount of resin (compare stocks A and B to control stock C). FIG. 1 also shows that a rubber composition containing guayule natural rubber with approximately 0% resin still shows lower modulus at 300% than #4RSS. Notably, FIG. 1 also shows that the stock containing guayule rubber with approximately 0% resin is still lower than those rubber compositions containing #4RSS. FIG. 2 shows cross link density of the guayule rubber containing compositions with 1% and 2.5% resin to be essentially equivalent.

In order to investigate the effect of the cure package components upon physical rubber properties, rubber formulations containing 100 phr of either guayule natural rubber of Hevea natural rubber were prepared according to the formulas provided below in Table 2. As can be seen from Table 2, the amount of sulfur and accelerator was adjusted in Hevea-containing stocks D, E and F to be 90%, 80% and 70% of the amount in control stock C. Guayule natural rubber obtained from Yulex Corporation was used in Stocks A and B.

TABLE 2

| Ingredient/Amount (in phr) | Stock A | Stock B | Stock C | Stock D | Stock E | Stock F |
|---|---|---|---|---|---|---|
| Rubber | 100 (Yulex 2.5%)[1] | 100 (Yulex 1.0%)[2] | 100 (RSS)[3] | 100 (RSS)[3] | 100 (RSS)[3] | 100 (RSS)[3] |
| Carbon black | 50 | 50 | 50 | 50 | 50 | 50 |
| Stearic acid | 2 | 2 | 2 | 2 | 2 | 2 |
| Antioxidant (6PPD) | 1 | 1 | 1 | 1 | 1 | 1 |
| Zinc oxide | 3 | 3 | 3 | 3 | 3 | 3 |
| Accelerator (TBBS)[4] | 0.8 | 0.8 | 0.8 | 0.72 | 0.64 | 0.56 |
| Sulfur | 1.3 | 1.3 | 1.3 | 1.17 | 1.04 | 0.91 |

Figure 3:
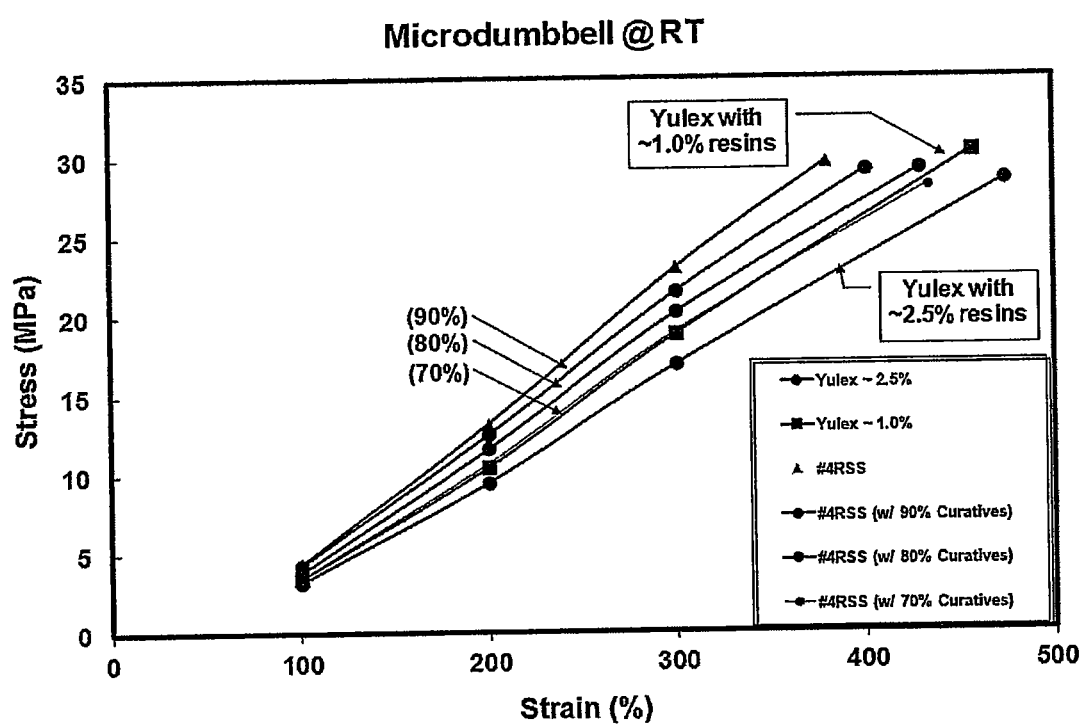
FIG. 3 is a graph showing tensile properties of rubber compositions containing either Hevea natural rubber with varying amounts of curatives or guayule natural rubber with varying amounts of resin at various elongations and at break.
Figure 4:
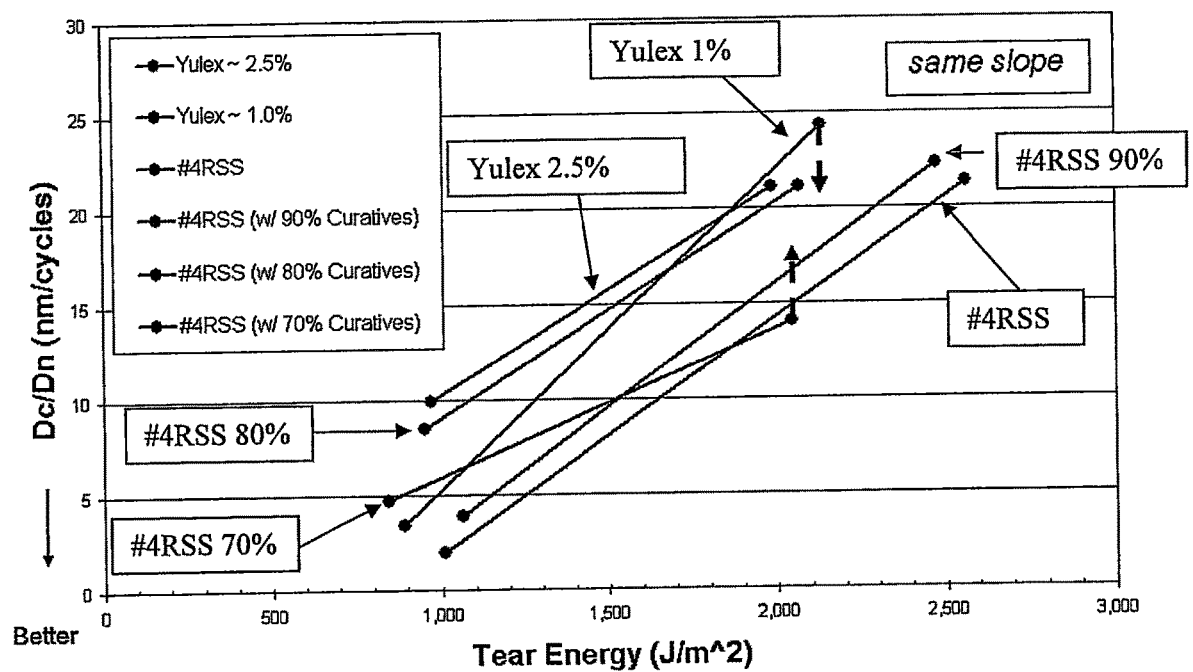
FIG. 4 is a graph showing crack growth resistance for rubber compositions containing either Hevea natural rubber with varying amounts of curatives or guayule natural rubber with varying amounts of resin.
Figure 5:
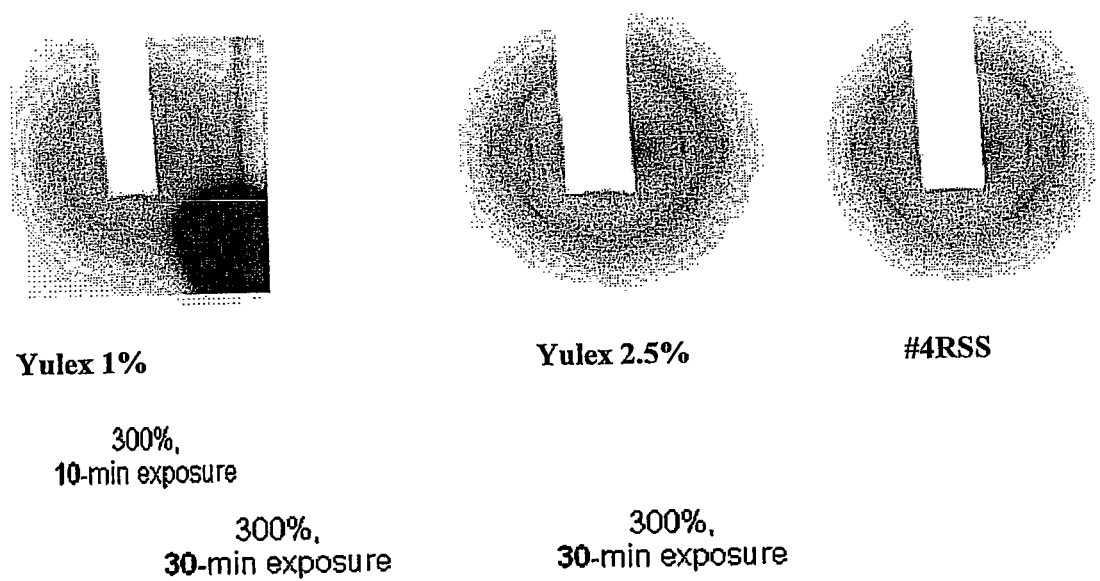
FIG. 5 shows the results of x-ray diffraction analysis of guayule natural rubber containing compositions with either 1% or 2.5% resin versus Hevea natural rubber and is evidence of the presence of strain induced crystallization in the guayule natural rubber containing compositions.

[1]Yulex guayule rubber containing approximately 2.5 weight % resin
[2]Yulex guayule rubber containing approximately 1 weight % resin
[3]Hevea rubber in the form of #4 rubber smoked sheet (RSS)
[4]2-(tert-butylaminothio)benzothiazole After formulating, samples of each stock were subjected to testing to determine the physical properties of the resulting stocks. Data obtained is reported in Table 3 below and illustrated in FIGS. 3 and 4. As can be seen from FIGS. 3 and 4, the physical properties of the rubber compositions can be manipulated by adjusting the cure package to reduce the amount of sulfur and accelerator. Based upon the data obtained from the experiments done using varying amounts of resin content in guayule natural rubber containing compositions and adjusting the cure package in Hevea natural rubber containing compositions, it is postulated that the physical properties of guayule natural rubber containing compositions can be adjusted by changing the cure package to increase the amounts of sulfur and accelerator by 30-300% and 30-200%, respectively, (as further detailed herein, including in the claims).

TABLE 3

| | Yulex ~2.5% | Yulex ~1.0% | #4RSS | #4RSS (w/ 90%) | #4RSS (w/ 80%) | #4RSS (w/ 70%) |
|---|---|---|---|---|---|---|
| CMPD MOONEY (130° C., FINAL) | | | | | | |
| MS1 + 4 (MU): | 48.8 | 56.5 | >200 | 46.0 | 59.7 | 57.3 |
| ML1 + 4 (MU): | 47.0 | 59.5 | | | | |
| MDR2000 (145° C., FINAL) | | | | | | |
| ML (kg · cm): | 3.4 | 3.8 | 4.0 | 4.1 | 3.8 | 3.6 |
| MN (kg · cm): | 16.0 | 16.2 | 17.6 | 17.5 | 15.0 | 13.5 |
| MH − ML (kg · cm): | 12.6 | 12.4 | 13.6 | 13.5 | 11.3 | 9.9 |
| ts2 (min): | 5.7 | 5.9 | 5.7 | 5.9 | 6.6 | 7.2 |
| ts5 (min): | 6.9 | 7.2 | 6.9 | 7.0 | 8.3 | 9.5 |
| t50 (min): | 7.5 | 7.7 | 7.7 | 7.8 | 8.7 | 9.4 |
| t90 (min): | 12.5 | 13.2 | 12.7 | 13.1 | 14.6 | 15.8 |
| t100 (min): | 23.7 | 24.4 | 22.5 | 22.8 | 24.8 | 26.7 |

TABLE 3-continued

| | Yulex ~2.5% | Yulex ~1.0% | #4RSS | #4RSS (w/ 90%) | #4RSS (w/ 80%) | #4RSS (w/ 70%) |
|---|---|---|---|---|---|---|
| MICRO DUMBELL TENSILE (23° C., FINAL, UNAGED) | | | | | | |
| Max. Stress (MPa) | 28.50 | 30.30 | 29.60 | 29.10 | 29.20 | 28.10 |
| 100% (MPa) | 3.21 | 3.46 | 4.35 | 4.29 | 3.86 | 3.46 |
| 200% (MPa) | 9.45 | 10.45 | 13.13 | 12.50 | 11.62 | 10.63 |
| 300% (MPa) | 16.89 | 18.79 | 23.00 | 21.48 | 20.20 | 18.91 |
| Brk Strain % | 474 | 457 | 380 | 401 | 429 | 434 |
| Toughness (MPa) | 60.73 | 62.04 | 49.79 | 52.95 | 57.59 | 55.06 |
| LAMBOURN (MULTI-PT, 65%) | | | | | | |
| Avg. Wt. Loss: | 0.1231 | 0.1214 | 0.1342 | 0.1284 | 0.1213 | 0.1172 |
| Avg. Intercept: | 7.9433 | 8.0111 | 8.1611 | 8.1738 | 8.0729 | 8.0070 |
| Avg. Slope: | −0.0017 | −0.0016 | −0.0018 | −0.0017 | −0.0016 | −0.0016 |
| Avg. Correlation: | −0.999 | −0.999 | −0.999 | −0.998 | −0.999 | −0.998 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. An improved tire rubber composition comprising a cured mixture which comprises on a phr basis:
   a. 10-90 phr of guayule natural rubber containing guayule resin and 90-10 phr of at least one conjugated diene monomer containing polymer or copolymer, wherein the total amount of guayule natural rubber and conjugated diene monomer containing polymer or copolymer is 100 phr,
   b. about 2 to about 4 phr of guayule resin,
   c. about 50 to about 100 phr of at least one filler including carbon black optionally in combination with silica,
   d. a cure package comprising
      i. 1.7 to 4 phr of sulfur,
      ii. 0.5 to 5 phr of at least one antioxidant,
      iii. 0.5 to 5 phr of zinc oxide,
      iv. 0.5 to 4 phr of stearic acid, and
      v. 2 to 3 phr of sulfur-containing accelerator,
   wherein (i) and (v) are present in a ratio of 0.75:1 to 2.6:1.

2. The tire rubber composition of claim 1, wherein the at least one conjugated diene monomer containing polymer or copolymer includes styrene-butadiene copolymer.

3. The tire rubber composition of claim 1, wherein the at least one conjugated diene monomer containing polymer or copolymer includes a monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene, and combinations thereof.

4. The tire rubber composition of claim 1, wherein the at least one conjugated diene monomer containing polymer or copolymer is a polymer consisting of 1,3-butadiene monomer.

5. The tire rubber composition of claim 1, wherein the at least one conjugated diene monomer containing polymer or copolymer includes a monomer selected from the group consisting of 1,3-butadiene, styrene, isoprene, and combinations thereof.

6. The tire rubber composition of claim 1, wherein the at least one conjugated diene monomer containing polymer or copolymer further comprises a monomer selected from the group consisting of styrene, a-methyl styrene, p-methylstyrene, o-methylstyrene, p-butylstyrene and vinylnaphthalene, and combinations thereof.

7. The tire rubber composition of claim 1, wherein the amount of sulfur is 1.7 to 2.6 phr.

8. The tire rubber composition of claim 1, wherein (i) and (v) are present in a ratio of 1.1:1 to 2.6:1.

9. The tire rubber composition of claim 1, wherein (i) and (v) are present in a ratio of 1.3:1 to 1.7:1.

10. The tire rubber composition of claim 1, wherein (ii) is present in an amount of 0.5 to 3 phr and (iv) is present in an amount of 0.5 to 2 phr.

11. A tire tread comprising a cured mixture which comprises on a phr basis:
    a. 10-90 phr of guayule natural rubber containing guayule resin and 90-10 phr of at least one conjugated diene monomer containing polymer or copolymer, wherein the total amount of guayule natural rubber and conjugated diene monomer containing polymer or copolymer is 100 phr,
    b. about 2 to about 4 phr of guayule resin,
    c. about 50 to about 100 phr of at least one filler including carbon black optionally in combination with silica,
    d. a cure package comprising
       i. about 1.7 to about 4 phr of sulfur,
       ii. about 0.5 to about 5 phr of at least one antioxidant,
       iii. about 0.5 to about 5 phr of zinc oxide, iv. about 0.5 to about 4 phr of stearic acid, and
v. about 2 to about 3 phr of sulfur-containing accelerator, wherein the cured mixture exhibits strain induced crystallization as evidenced by X-ray diffraction and has at least one of a max stress at break, a 200% Modulus, a 300% Modulus or an elongation at break that is no more than +/−15% as compared to a comparative rubber composition that contains Hevea natural rubber instead of guayule natural rubber.

12. The tire tread of claim 11, wherein the at least one conjugated diene monomer containing polymer or copolymer includes styrene-butadiene copolymer.

13. The tire tread of claim 11, wherein the at least one conjugated diene monomer containing polymer or copolymer includes a monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene, and combinations thereof.

14. The tire tread of claim 11, wherein the at least one conjugated diene monomer containing polymer or copolymer is a polymer consisting of 1,3-butadiene monomer.

15. The tire tread of claim 11, wherein the at least one conjugated diene monomer containing polymer or copolymer includes a monomer selected from the group consisting of 1,3-butadiene, styrene, isoprene, and combinations thereof.

16. The tire tread of claim 11, wherein the at least one conjugated diene monomer containing polymer or copolymer further comprises a monomer selected from the group consisting of styrene, a-methyl styrene, p-methylstyrene, o-methylstyrene, p-butylstyrene and vinylnaphthalene, and combinations thereof.

17. The tire tread of claim 11, wherein the amount of sulfur is 1.7 to 2.6 phr.

18. The tire tread of claim 11, wherein (i) and (v) are present in a ratio of 1.1:1 to 2.6:1.

19. The tire tread of claim 11, wherein (ii) is present in an amount of 0.5 to 3 phr and (iv) is present in an amount of 0.5 to 2 phr.

20. A tire tread comprising a cured mixture which comprises on a phr basis:
a. 10-90 phr of guayule natural rubber containing guayule resin and 90-10 phr of at least one conjugated diene monomer containing polymer or copolymer, wherein the total amount of guayule natural rubber and conjugated diene monomer containing polymer or copolymer is 100 phr,
b. about 2 to about 4 phr of guayule resin,
c. about 50 to about 100 phr of at least one filler including carbon black optionally in combination with silica,
d. a cure package comprising
i. about 1.2 to about 4 phr of sulfur,
ii. about 0.5 to about 5 phr of at least one antioxidant,
iii. about 0.5 to about 5 phr of zinc oxide,
iv. about 0.5 to about 4 phr of stearic acid, and
v. about 2 to about 3 phr of sulfur-containing accelerator, wherein (i) and (v) are present in a ratio of 0.75:1 to 2.6:1, and wherein the cured mixture exhibits strain induced crystallization as evidenced by X-ray diffraction and has at least one of a max stress at break, a 200% Modulus, a 300% Modulus or an elongation at break that is no more than +/−15% as compared to a comparative rubber composition that contains Hevea natural rubber instead of guayule natural rubber.

* * * * *